3,379,640
SELECTIVE CATALYTIC CONVERSION WITH A CRYSTALLINE ALUMINOSILICATE
Nai Yuen Chen, Cherry Hill, and William E. Garwood, Haddonfield, N.J., assignors to Mobil Oil Corporation, a corporation of New York
No Drawing. Filed Jan. 24, 1966, Ser. No. 522,368
9 Claims. (Cl. 208—111)

This invention relates generally to conversion processes involving crystalline aluminosilicate catalysts characterized by their ability to selectively direct said conversion processes toward critical reaction paths and by their ability to direct the reaction of certain specific compounds from a mixture of reactants. More particularly, this invention relates to an improvement in the area of selective catalytic conversion based on the shape or molecular dimension of reactants or products involving certain crystalline aluminosilicates having a hydrogenation/dehydrogenation component associated therewith in a particular manner.

In particular, the invention described herein is an improvement in catalytic processing operations carried out in the presence of a solid crystalline zeolitic structure of very well-defined intra-crystalline dimensions which has the ability, by reason of this intra-crystalline dimension, to allow the passage into or out of its crystalline cavities of only certain molecules, that is, of molecules having particular size or shape. By associating hydrogenation/dehydrogenation activity with the intra-crystalline spaces for the chemical reaction system which is to be catalyzed, only such conversion paths are obtained which involve reactant or product molecules of such specific shapes or sizes. Such zeolites wherein molecules of particular size and shape are able to enter are sometimes known as molecular filters or molecular sieves.

The use of crystalline aluminosilicates having catalytic activity located within the interior of the crystalline solid to effect selective catalytic conversion is known in the art, and in fact, is described and claimed in U.S. Patent 3,140,322. Said United States patent discloses and claims a wide variety of selective catalytic conversion processes utilizing crystalline aluminosilicates having catalytic activity located within the interior thereof and represents a significant advance in the utilization of the unusual properties of crystalline aluminosilicates to direct specific conversions.

However, it should be immediately apparent that in order to have a successful conversion catalyst, said catalyst must possess certain physical properties independent of its chemical activity and/or selectivity, and quite obviously, the necessary physical properties will vary depending upon the particular process or class of processes desired to be catalyzed. Thus, for example, a catalyst used at extremely high temperatures must be physically stable at those temperatures whereas high temperature stability is not necessarily required with a catalyst which is used to catalyze processes at low temperatures. Additionally, and perhaps more significantly, a crystalline aluminosilicate which is an effective shape-selective conversion catalyst for one process, may not be an effective catalyst for another process operated at a different set of conditions, due to the fact that it might be physically stable in the former process but not physically stable in the latter.

In accordance with the above, it has been found that heretofore, when a crystalline aluminosilicate having associated therewith a hydrogenation-dehydrogenation component either as an elemental metal or in the form of a metallic cation was employed as a selective conversion catalyst in those processes wherein water was present either as a reactant product or in a subsequent regeneration step, that the selectivity of said class of zeolites rapidly deteriorated due to their physical instability under the necessary process conditions employed.

Accordingly, it is the primary object of this invention to provide crystalline aluminosilicates bearing within the interior thereof hydrogenation/dehydrogenation activity which are stable under severe process conditions, particularly those process conditions encountered when water is present either as a product, reagent or in a regeneration step.

In one embodiment, this invention is concerned with novel, stable, shape-selective crystalline aluminosilicates bearing within the interior thereof hydrogenation-dehydrogenation activity, said aluminosilicates possessing an extremely high degree of selectivity.

In another embodiment, this invention is concerned with a novel method for the preparation of stable shape-selective crystalline aluminosilicates involving base exchange of certain crystalline aluminosilicates under very critical conditions.

In still another embodiment, this invention is concerned with carrying out selective catalytic conversion processes with aluminosilicates having specific critical characteristics wherein extremely high degrees of selectivity to desired products are obtained.

As has heretofore been stated, shape selective catalytic conversion is known in the art and is described and claimed in U.S. Patent 3,140,322. In accordance with the teachings of said patent, there are generally two types of selective catalytic processing operations which can be carried out, and it is to be understood that this invention is equally applicable to both types of process. The two types of selective catalytic processing can be characterized as follows:

(1) In a reactant mixture containing the materials A, B and c which would normally catalytically react to give the respective products A', B' and c', it is possible to selectively provide reactivity only for the reaction c→' by incorporating the catalytic sites within surfaces accessible only through openings of a size which will allow c and c' to pass, but will not be penetrable by A and B. This type of system will be referred to as the reactant-selective system. It is illustrated by writing the set of possible catalytic reactions which would normally be capable of proceeding, but wherein only one specific reactant, as well as its reaction product c' is capable of passing to and from the solid particle; which is indicated by the use of the lower case letter c in contrast to capital letters for the species which are too large to pass as indicated by the following:

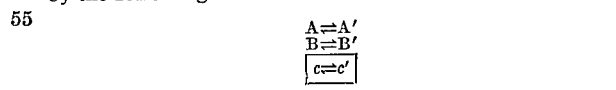

The net reaction which will selectively proceed is indicated by the box. In principle, of course, there may be any number of possible simultaneous reactions, as well as the ability to select more than one specific net reaction.

(2) In a process which normally transforms a species $a$ into alternate products $b$, C, D, etc., the reaction to form only, say $b$, may be catalyzed wherein $a$ and $b$ molecules are of a size smaller than C and D and the catalyst base filter-dimension is chosen to pass only $a$ and $b$.

This type of a reaction system will be referred to as the product selective system. It is best illustrated by one or both of the following sets of reaction schemes:

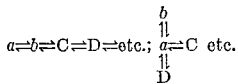

Again, molecular species are indicated in the lower case when they are small enough to pass the structure, or as capital letters when they are not.

This embodiment of the invention is based on the very important recognition that some of the reaction products, like C and D, can be produced within the crystal chamber, until their concentration approaches their thermodynamic equilibrium value within the chambers, but that nevertheless no net production rate, as regards the external user, will or can proceed because of size restriction.

As has heretofore been stated, this invention is concerned with certain crystalline aluminosilicates bearing within the interior thereof hydrogenation/dehydrogenation activity and the improved results obtained therefrom both in regard to physical characteristics and chemical selectivity. The crystalline alumino-silicates utilized in the instant invention are characterized by possessing the following three criticalities (a) a silicon to aluminum atomic ratio of at least 1.8, (b) substantially free of hydrogenation/dehydrogenation activity on the exterior of the aluminosilicate, and (c) containing within the interior thereof no more than about 1.5 cations in a supercage of metals having hydrogenation/dehydrogenation activity.

The first criticality in the novel catalyst of this invention resides in the silicon to aluminum ratio of the crystalline materials. As is well known, molecular sieves are essentially the dehydrated forms of crystalline natural or synthetic hydrosiliceous zeolites containing varying quantities of sodium, calcium and aluminum with or without other metals. All or a portion of the sodium or calcium ions normally contained in a molecular sieve structure may be zeolitically replaced with a number of various other ions. The atoms of sodium, calcium or ions in replacement thereof, silicon, aluminum and oxygen, and these zeolites are arranged in the form of an aluminosilicate salt in a definite and consistent crystalline pattern. The structure contains a large number of cavities or supercages, interconnected by a number of small holes or channels. These cavities and channels are precisely uniform in size. Chemically, these zeolites may be represented by the general formula:

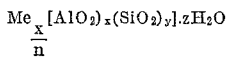

where Me is a cation, $x/n$ is the number of exchangeable cations of valence $n$ and $x$ is also the number of aluminum atoms combined in the form of aluminate, $y$ is the number of silicon atoms and $z$ is the number of water molecules, removal of which produces the characteristic channel system. In accordance with the teachings of this invention, it has been found that in order to prepare catalysts of unusual stability and selectivity, the silicon to aluminum atomic ratio, i.e., the ratio $y/x$ in the above formula should be at least as great as 1.8 and even more desirably at least as great as 3.0. Therefore, the aluminosilicates which can be used to prepare novel catalysts of this invention would include chabazite, gmelinite, stilbite, offretite, Zeolite T, ZK-4, mordenite and faujasite of the Y type. These materials have pore sizes ranging from about 5 to about 13 Angstrom units and the pore size of the aluminosilicate employed will be determined by the particular reaction desired to be catalyzed.

While not wishing to be bound by any theory of operation, nevertheless, it appears that the crystal structure of aluminosilicates having a silicon to aluminum ratio of less than 1.8 tends to collapse when employed in conversion processes where it becomes exposed to water. As the crystal structure collapses, the metal in the interior thereof becomes exposed to the surface thereby destroying the shape selectivity of the aluminosilicate. Therefore, it is absolutely critical in the instant invention that the aluminosilicate employed have sufficiently high silicon to aluminum atomic ratios so that the crystal structure will not be damaged during the processing operations.

The second criticality of the novel catalyst of this invention resides in the fact that substantially no hydrogenation/dehydrogenation is present on the exterior surface of the crystal whether in the form of cations, elemental metal or compounds thereof. As has heretofore been stated, the novel process resides in an improvement in shape selective catalysis and it is essential that the hydrogenation/dehydrogenation activity be confined in the intra-crystalline channels of the aluminosilicate so that only selected portions of the feed and/or product will be exposed thereto. Quite obviously, if a crystalline aluminosilicate has substantial hydrogenation/dehydrogenation activity on the exterior surface thereof, said material might very well be an effective catalyst but would not be a shape-selective catalyst.

The third characteristic of the stable shape-selective crystalline aluminosilicates employed in the novel process of this invention is that they contain, within the interior thereof, no more than about 1.5 cations in a supercage of metals having hydrogenation/dehydrogenation activity.

It is to be immediately understood that it is absolutely essential that the aluminsilicates possess all three characteristics in order to achieve the superior results of this invention. While not wishing to be bound by any theory of operation, it nevertheless appears that if more than 1.5 cations in a supercage of aluminosilicate are placed within the interior thereof, the excess metal cations have a tendency to move and during the course of the conversion reaction, tend to migrate to the exterior of the aluminosilicate loses its shape selectivity.

Therefore, it can be seen that although the prior art has described many processes wherein a crystalline aluminosilicate has been brought in contact with a transition metal by various techniques including so-called metal loading and/or ion exchange, nevertheless, the resulting product did not meet the three characteristics above referred to so that it either did not possess any shape selectivity initially or rapidly lost what initial shape selectivity it possessed when it was used in a conversion process. It can therefore be seen that each of the necessary characteristics of the novel shape-selective aluminosilicate catalysts of this invention must be present in order to have stable shape-selective conversion catalysts.

The novel aluminosilicate catalysts of this invention are prepared by base exchanging a crystalline aluminosilicate having an atomic ratio of silicon to aluminum of to least 1.8 with aqueous salt solutions of the desired metal cation or cations possessing hydrogenation/dehydrogenation activity under very specific and critical conditions.

The first criticality in the method for the preparation of the instant catalysts is that the base exchange must be carried out at a pH such that the hydroxide of the metal cation being introduced cannot form and be deposited on the aluminosilicate. For reasons not completely understood, it has been found that if base exchange is carried out under conditions such that a hydroxide of the metal cation introduced is formed, the hydroxide has a tendency to deposit on the crystalline aluminosilicate thereby resulting in a catalyst which is not shape-selective. Thus, for example, if an aluminosilicate were to be base exchanged with a nickel chloride solution and the pH of the base exchange solution at any time during contact with the crystalline aluminsilicate were to be such that it would allow the formation of nickel hydroxide, such a procedure would result in the formation of a catalyst which did not possess the shape selective characteristics desired herein.

It should be immediately understood that there are many methods for conducting a base exchange operation to insure that the pH is such that hydroxide formation will not be possible. Thus, for example, a solution of the desired metal cations can be continuously passed over a bed of the desired aluminosilicate in any convenient manner and this continuous technique will preclude the possibility of the formation of the hydroxide precipitate due to the fact that the cations removed from the aluminosilicate do not remain in contact therewith. However, batch base exchange techniques can also be employed but certain precautions must be taken. Thus, for example, the aluminosilicate and the solution of the desired cation can be placed in any suitable vessel and the pH of the solution measured. The base exchange is then carried out to a point at which the pH does not favor hydroxide formation due to the migration of the cations originally associated with the aluminosilicate into the exchange solution. This batch procedure can be repeated many times if in fact it is not possible to introduce a sufficient amount of cations in one operation. The pH at which a particular hydroxide compound will form is well known in the art and will obviously vary for each individual metal cation.

The second criticality in the method for the preparation of the novel cations of this invention is that a temperature of base exchange must be sufficiently high to insure uniform distribution of the desired cation within the crystalline structure. If too low a temperature of exchange is employed, proper diffusion of the desired cations within the pores of the crystalline aluminosilicates will not be possible thereby resulting in a catalyst which is either non-shape selective initially or one which will rapidly lose what shape selectivity it might originally possess. Therefore, itis absolutely critical in the process of this invention that a sufficiently high temperature of exchange be employed. In this regard the exchange is carried out at temperatures ranging from about 75° C. to 150° C. or higher with 100° C. being preferred.

A third criticality in the process for the preparation of the novel catalysts of this invention is that cations of metals must be used that are capable of entering within the pores of the specific aluminosilicate which is being treated. Thus, for example, if it were desired to prepare a shape-selective crystalline aluminosilicate having a pore size of about 5 Angstrom units, such a material could not be prepared by simple base exchange with a solution of platinum tetrammine cations since the platinum cations have a diameter greater than the pore openings of the 5 Angstrom aluminosilicate. It should appear quite obvious that since one of the criticalities of the novel catalyst of this invention is that the hydrogenation/dehydrogenation activity be confined within the internal pore structure of the crystalline aluminosilicate that said catalyst can only be prepared if the particular metal cation cam, in fact, enter within the pores of the aluminosilicate. It is to be immediately understood that the molecular diameters of the various metallic cations are well known in the art and suitable metal cations for a particular aluminosilicate can very easily be determined. It should also be noted that when employing an aluminosilicate with a pore size of about 13 Angstrom units, cations of all metals within the scope of this invention can enter within the internal pore structure thereof.

The metal cation which present hydrogenation/dehydrogenation activity and are operable to prepare the novel catalyst of this invention include chromium, manganese, iron, cobalt, nickel, molybdenum, ruthenium, rhodium, palladium, tungsten, osmium, iridium and platinum. Of these metals the particularly preferred ones are cobalt, nickel, platinum and palladium. When the catalyst of this invention is used for oxidative reaction, the metal cations may also include those of vanadium, copper, zinc, silver, cadmium and gold.

As has heretofore been stated, one of the characteristics of the novel shape-selective crystalline aluminosilicate catalysts of this invention is that they contain within the interior thereof no more than about 1.5 cations in a supercage of metals having hydrogenation/dehydrogenation activity. It should be noted, however, that there are various methods for preparing the catalysts of this type insofar as the extent of introduction of metals is concerned. In other words, the catalyst can be prepared by base exchange with a desired metal only to a point at which 1.5 cations per supercage are present in the aluminosilicate or the aluminosilicate can be base exchanged with a solution of the desired metal cation and if, in fact, more than 1.5 cations per supercage are found to be associated with the aluminosilicate, batch base exchange can be carried out, i.e., with a different ion, e.g., a calcium ion or an ammonium ion, in order to reduce the metal ion content back to the desired level. Thus, it can be seen that if the base exchange of the aluminosilicate is carried out in accordance with the criticalities previously set forth, i.e., pH and high temperature, that if too many metal cations are associated with the aluminosilicate they can be reduced to a given level by back base exchange. On the other hand, it should be made immediately clear that if base exchange is carried out under conditions such that hydroxide formation is encountered, no amount of back base exchange will result in the production of the novel shape-selective catalysts of this invention.

As a practical matter, the extent of base exchange to introduce a desired quantity of a particular metal cation can be very easily calculated, based on the quantity and nature of the particular aluminosilicate as well as the metal cation desired to be introduced. Base exchange is then carried out at elevated temperatures and conditions such that no hydroxide formation occurs and the aluminosilicate can then be analyzed for metal ion content. If the cation content is found to be too high, the aluminosilicate can then be back base exchanged with a solution of sodium or calcium ions until the desired amount of metal cation is found to be present in the aluminosilicate.

Representative of the metal salts which can be employed to base exchange the aluminosilicates include chlorides, bromides, iodides, carbonates, bicarbonates, sulfates, sulfides, thiocyanates, dithiocarbonates, peroxysulfates, acetates, benzoates, citrates, fluorides, nitrates, nitrites, formates, etc. The only limitation of the particular salts is that they be sufficiently soluble to give the necessary ion transfer. The preferred salts are chlorides, nitrates, sulfates and acetates.

The concentration of the metal salts in the aqueous solution is also narrowly critical and can range from 0.05 N and lower up to 5 N and higher, although 0.5 N solutions are preferred for ease of operations.

Following the treatment with the aqueous metal salts, the aluminosilicate is washed with water, preferably distilled water, and generally thereafter dried between 150° F. and 600° F. The aluminosilicate can thereafter be calcined in air or an inert atmosphere of nitrogen, hydrogen, helium, flue gas or other inert gas at temperatures ranging from about 500° F. to 1500° F for periods of time ranging from 1 to 48 hours or more.

It is to be understood that this invention includes base exchanging the crystalline aluminosilicate with other ions not possessing hydrogenation/dehydrogenation activity either before, after or during the base exchange with the solutions above described. Thus, for example, the aluminosilicates can be contacted with suitable salt solutions of calcium, rare earths, ammonium, acids, ethylenediamine tetracetic acid or any mixtures thereof in order to impart additional catalytic activity for a particular reaction desired to be catalyzed. Thus, for example, if it were desired to catalyze acid-type reactions such as hydrocracking, hydroisomerization or hydrodealkylation, the preferred procedure would be to first contact the crystalline aluminosilicates with cations capable of imparting acidity thereto, i.e., hydrogen ions, ammonium ions or cations of trivalent metals such as rare earths or mixtures thereof and thereafter treating the aluminosilicate with solutions of the desired metals in the manner above described.

More specifically, a supercage in offretite may be represented by the formula:

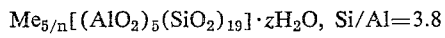
$$Me_{5/n}[(AlO_2)_5(SiO_2)_{19}] \cdot zH_2O, \ Si/Al=3.8$$

where Me, $n$ and $z$ have been previously defined. At least one of the five monovalent cationic sites is outside the supercage and therefore not effective in hydrogenation/dehydrogenation activity. It would be, therefore, preferable to have cations other than hydrogenation/dehydrogenation metal cations in these positions before the metal ion exchange. Cations such as K, rare earth, etc., are particularly preferable in view of their size and their tendency to be fixed in position. Subsequent metal exchange would be carried out with the final metal ion concentration not more than 1.5 cations, preferably not more than 1 cation, in the supercage. In the case of nickel or cobalt, this represents a metal concentration of about 4 weight percent of the dehydrated zeolite. Depending on the hydrogenation/dehydrogenation activity of the metal cations, the lower limit can be as low as $10^{-3}$ or 1 in 1000 supercages.

Another illustrative example of the preparative procedure would be in the case of faujasite of the Y type, which supercage may be represented by the formula:

$$Me_{8/n}[(AlO_2)_8(SiO_2)_{16}] \cdot 2H_2O, \ SiO_2/Al_2O_3=2.0$$

In its dehydrated state at least four of the eight monovalent cationic positions are outside of the supercage. Again it would be preferable to have cations other than hydrogenation/dehydrogenation metal cations in these positions. Depending on the desired acid activity of the final catalyst, alkali metal, alkaline earth metal, rare earth, $NH_4^+$ or $H^+$ may be placed in these positions before the metal ion exchange. Cations such as K, rare earth, etc., are particularly preferable in view of their size, and their tendency to be fixed in position. Subsequent metal exchange would be carried out with the final metal ion concentration not more than 1.5 cations, preferably not more than 1 cation in the supercage.

The catalysts prepared in accordance with this invention find extensive utility in a wide variety of hydrocarbon conversion processes including hydroisomerization, hydrodealkylation, hydrodisproportionation, hydrocarbon oxidation, dehydrogenation, desulfurization, hydrogenation, hydrocracking, polymerization and the like. As has heretofore been stated, the catalysts are exceptionally stable and are particularly useful in such of the above and related processes carried out at temperatures ranging from ambient temperatures of 70° F. up to 1400° F., including such processes in which the catalysts are periodically regenerated by burning off the combustible deposits.

By way of example, the hydrogenolysis of hydrocarbons such as propane, butylene, butane, pentane, hexane, cyclopentane, cyclohexane, methyl cyclohexane and the like, can be carried out at temperatures ranging from about 300° F. to 1025° F. under atmospheric or superatmospheric pressures with a space velocity (LHSV) from 0.2 to 5000.

For desulfurization of hydrocarbons, the process can be carried out at temperatures between 600° F. and 1000° F. under atmospheric or superatmospheric pressures with a space velocity (LHSV) between 0.2 and 50. The specific conditions within these ranges will vary with the feed stock undergoing desulfurization of the product desired.

The catalysts of this invention can be employed for hydrogenation of unsaturated aliphatic hydrocarbons, such as mono-olefins, diolefins, etc., to form the corresponding saturated hydrocarbons, hydrogenation of unsaturated cyclic hydrocarbons and hydrogenation of unsaturated alcohols, ketones, acids, etc. For hydrogenation reactions, the temperature may range up to 1000° F. tween 400° F. and 825° F. using a molar ratios with at a space velocity (LHSV) of about 0.2 to 500.

Hydrocracking of heavy petroleum residual stocks, cycle stocks, etc., may be carried out at temperatures between 400° F. and 825° F. using a molar ratios with hydrogen to hydrocarbon charge in a range of about between 400° F. and 825° F. using molar ratios with 10 and 2500 p.s.i.g. and the space velocity between 0.1 and 100.

The catalysts of the invention may be further utilized for the alkylation of aromatic hydrocarbons or phenols and for the conversion of olefinic, acetylenic and naphthenic hydrocarbons. Alkylation of aromatics and phenols may be carried out at temperatures between 15° F. and 850° F. under pressure of 0 to 1000 p.s.i.g.

It is to be understood that in all the above-listed reactions, the desired products will govern the particular pore size of the aluminosilicate chosen to catalyze the reaction. Thus, for example, if selective reaction of straight chain compounds are desired from a mixture of straight chain compounds with branched chain or aromatic compounds, then crystalline aluminosilicates having a pore size of about 5 Angstrom units will be employed as an effective catalyst. In like manner, if a reaction is desired of an unsubstituted aromatic compound in admixture with at least one polysubstituted aromatic compound, a crystalline aluminosilicate having a pore size of approximately 10 to 13 Angstrom units in diameter will be an effective catalyst.

Another embodiment of this invention, although less preferred, includes the incorporation of the crystalline aluminosilicate catalyst in a porous matrix. Porous matrices and methods of incorporating crystalline aluminosilicates therewith are disclosed in U.S. Patent 3,140,253, the disclosure of which is incorporated by reference.

Although the instant invention has been described with particular emphasis upon shape-selective conversions, nevertheless, it should be understood that the catalysts are equally applicable in those situations where shape selectivity is not a major factor. It would appear quite obvious, for example, that if the novel catalyst of this invention can be successfully employed for the selective conversion of normal paraffins from a mixture of the same with isoparaffins, that the catalyst would function equally as well if, in fact, a feed stock were to consist solely of normal paraffins. Thus, although the major importance of the novel catalysts of this invention resides in the fact that they can selectively cause the reaction of one component or class of components from a mixture of components, nevertheles, their applicability is not limited thereto.

The following examples will illustrate the novel catalysts and conversion processes of this invention:

Example 1

10 grams of a natural crystalline aluminosilicate identified as offretite obtained from Mount Moses, Nev., and analyzing as follows:

|  | Weight Percent | Si/Al |
|---|---|---|
| $SiO_2$ | 65.9 | 3.75 |
| $Al_2O_3$ | 15.0 |  |
| $Fe_2O_3$ | 3.8 |  |
| $K_2O$ | 3.5 |  |
| $CaO$ | 3.0 |  |
| $Na_2O$ | 6.7 |  |
| $MgO$ | 0.7 |  |
| $TiO$ | 0.2 |  |
| Total | 98.8 |  | were added to a 500 milliliter aqueous solution of 0.5 N nickel chloride which was refluxed in a boiling flask fitted with a reflux condenser and undergoing stirring with a magnetic stirrer. The mixture was stirred and refluxed for 10 minutes and filtered while hot followed by washing with 500 milliliters of distilled water. The entire procedure was again repeated and the mixture filtered and washed as before. This technique of base exchange, i.e., the short contact time, prevented the formation of nickel hydroxide. The resulting product had excellent catalytic selectivity and activity and analyzed as follows:

|  | Weight Percent | Si/Al |
|---|---|---|
| $SiO_2$ | 66.3 | 3.1 |
| $Al_2O_3$ | 18.1 | |
| $Fe_2O_3$ | 2.9 | |
| $K_2O$ | 4.4 | |
| $CaO$ | 1.0 | |
| $Na_2O$ | 1.0 | |
| $MgO$ | 0.4 | |
| $NiO$ | 5.8 | |
| Total | 99.9 | |

From the above example, it can be seen that approximately 30% of the occluded iron can be removed and that the potassium was substantially unexchanged. The fact that the total equivalent cations to aluminum ratio was restored to near unity (not including occluded iron) and that the Si/Al ratio is reduced from 3.75 to 3.1 suggested that the original natural offretite contained some sodium silicate which was solubilized during the exchange process.

Example 2

This example will illustrate the conversion of offretite to its ammonium form prior to incorporating the hydrogenation component substantially within the interior thereof.

Twenty(20) grams of natural offretite described in Example 1 were subjected to two contacts with 200 milliliters of 5 N ammonium chloride solution at room temperature for two hours and then contacted with another 200 milliliters of 5 N ammonium chloride solution at room temperature overnight. After these exchanges, the mixture was filtered and washed with 500 milliliters of distilled water.

The ammonium offretite thus obtained was added to 500 milliliters of boiling 0.5 N nickel acetate solution as described in Example 1. The mixture was stirred and refluxed for ten minutes and filtered while hot, followed by washing with 500 milliliters of distilled water. In this preparation, only one exchange with nickel acetate was used and no nickel hydroxide was deposited. The resulting product analyzed as follows:

|  | Weight Percent | Si/Al |
|---|---|---|
| $SiO_2$ | 72.5 | 3.55 |
| $Al_2O_3$ | 17.4 | |
| $Fe_2O_3$ | 2.4 | |
| $K_2O$ | 4.1 | |
| $CaO$ | 3.1 | |
| $Na_2O$ | 0.1 | |
| $MgO$ | 0.2 | |
| $NiO$ | 5.9 | |
| Total | 105.7 | |

It is noted that in this example, the ammonium exchange preferentially removes sodium from natural offretite and in only one exchange with nickel, 46% of the sites were replaced by nickel as compared to 44% of the sites in the method of Example 1 wherein two exchanges were used.

Example 3

60 grams of natural offretite described in Example 1 were contacted with 600 milliliters of concentrated sulfuric acid for 60 hours at room temperature. The mixture was filtered under vacuum and the filter cake was again contacted with 60 millilters of fresh concentrated sulfuric acid for 2 hours. Following this second contact, the mixture was again filtered to remove as much acid as possible and the resulting filter cake was added to three liters of distilled water. The resulting mixture was stirred and filtered and thereafter the filter cake was washed with water and then dried in air.

20 grams of the sulfuric acid treated offretite was then added to 500 milliliters of boiling 0.5 N nickel chloride solution as previously described and the mixture was stirred and refluxed for 10 minutes followed by filtering while still hot and washing with 500 milliliters of distilled water. No nickel hydroxide was formed during this exchange.

The products obtained have the following composition:

|  | Weight Percent | Si/Al |
|---|---|---|
| $SiO_2$ | 80.5 | 4.6 |
| $Al_2O_3$ | 14.9 | |
| $Fe_2O_3$ | 0.1 | |
| $K_2O$ | 2.7 | |
| $CaO$ | 0.2 | |
| $Na_2O$ | 0.2 | |
| $MgO$ | 0.4 | |
| $NiO$ | 0.5 | |
| Total | 99.5 | |

The above analysis indicates that the amount of nickel exchanged in 10 minutes is far less than that of Examples 1 and 2.

Example 4

The catalyst prepared in accordance with the procedure of Examples 1, 2 and 3 were evaluated for their ability to catalyze selective oxidation. The criterion for selective oxidation of each catalyst was based on its ability to preferentially oxidize n-hexane in preference to 2-methylpentane in a 50/50 weight percent iso- to normal charge in the presence of oxygen. The test procedure involved calcining one-half cubic centimeter of the powdered catalyst for one hour at 750° F. in air at a flow rate of 50 cc. a minute. After the calcination, the oxidation test was carried out at 650° F. by continuously passing over the catalyst a vapor stream consisting of 100 cc. of oxygen and 0.24 cc. of a 50/50 weight percent mixture of n-hexane and 2-methylpentane per minute. Samples of the product stream were obtained after 20, 40 and 60 minutes on stream and subjected to analysis by gas chromotography.

The catalysts prepared in accordance with Examples 1, 2 and 3 were evaluated in the oxidation tests with the following results:

| Catalyst | Ni, wt. percent | Oxidation, wt. percent/ wt. percent $iC_6/nC_6$ |
|---|---|---|
| Example 1 | 4.6 | Nil/85.4 |
| Example 2 | 4.6 | 0.5/76 |
| Example 3 | 0.4 | Nil/52 |

From the above three experiments, it can be seen that the catalysts of this invention are extremely selective in that they caused substantially no oxidation of the iso-compound and substantial oxidation of the normal compound.

Example 5

The catalysts prepared by the procedures of Examples 1, 2 and 3 were evaluated for the selective hydrogenolysis of two separate mixtures—one consisting of n-hexane and 2-n-pentane and the other of n-octane and iso-octane.

Each of the catalysts prepared in accordance with procedures of Examples 1, 2 and 3 was pretreated by contacting them with helium for 10 minutes at room temperature up to 750° F. followed by contacting each of them for five minutes with hydrogen from 750° to 1000° F. The five minute treatment with hydrogen was followed by an additional 20 minute treatment with hydrogen at 1000° F. thereafter retreating for five minutes with helium then cooling to reaction temperature.

One-half cubic centimeter of each of the catalysts treated in the above manner was charged to separate glass reactors into which were then passed 2 cc. charge pulses from glass bulbs containing 10 millimeters of n-hexane, 10 millimeters of 2-methylpentane and 744 millimeters of hydrogen in one, and 10 millimeters of n-octane, 10 millimeters of 2,2,4-trimethylpentane and 737 millimeters of hydrogen in the other.

The test procedure involved maintaining a temperature of about 900° F. with a hydrogen flow of 60 cubic centimeters per minute flowing over the catalyst and a 3 cubic centimeter charge pulse was passed over the catalyst and the product stream was thereafter analyzed by gas chromotography. The results obtained are shown in the following table:

|  | Pulse Hydrogenolysis, wt. percent/wt. percent | |
|---|---|---|
|  | iC$_8$/nC$_8$ | iC$_6$/nC$_6$ |
| Example 1 | Nil/68 | Nil/15 |
| Example 2 | Nil/93 | Nil/53 |
| Example 3 | Nil/58 | Nil/54 |

The above six experiments conclusively demonstrate the shape-selective catalytic ability of the novel catalyst of this invention in that, as can be seen, no iso-compounds were converted whereas the normal compounds were.

Example 6

The catalyst prepared in accordance with Example 2 was tested for selective hydrogenation of n-pentane in admixture with iso-octene in accordance with the following procedure.

0.5 cubic centimeters of the catalyst was heated in air for one hour at 1000° F. followed by treatment at 1000° F. for 5 minutes with helium, again followed by treatment with hydrogen for 20 minutes at 1000° F. and thereafter cooling to room temperature in the presence of the hydrogen.

0.5 cc. of the above-treated catalyst was then contacted at a flow rate of 0.4 cc. per hour with a 1.1 mixture of 2,4,4-trimethylpentene and n-pentene-2 together with a hydrogen flow of 50 cc. per minute at a temperature of 250° F. and the product analyzed by gas chromotography.

The following table will show the results of this test:

Catalyst:      Hydrogenation wt. percent/ wt. percent $iC_8/nC_5$
Example 1 ------------------------------ 1/30

The above example clearly demonstrates the selective hydrogenation ability of the novel catalyst of this invention in that substantially no iso-compound was hydrogenated whereas a significant amount of the straight chained compound was hydrogenated.

Example 7

In order to demonstrate the criticality of carrying out base exchange such that hydroxide formation is substantially impossible, three samples of the natural offretite as described in Example 1 were treated with boiling 0.5 N nickel chloride in the following manner:

(a) One sample was contacted with the nickel chloride solution for two minutes and is designated as Catalyst 4.

(b) A second sample was contacted with the nickel chloride for 10 minutes twice and is designated as Catalyst 5.

(c) A third sample was contacted for 10 minutes twice followed by an additional treatment for 60 minutes and is designated as Catalyst 6.

The procedures identified as (a) and (b) resulted in no nickel hydroxide formation whereas procedure (c) did produce nickel hydroxide.

The analysis of the samples are shown in the following tables.

TABLE

| Sample | Untreated Original | Catalyst 4 | Catalyst 5 | Catalyst 6 |
|---|---|---|---|---|
| SiO$_2$ | 65.9 | 66.2 | 66.3 | 67.7 |
| Al$_2$O$_3$ | 15.0 | 15.7 | 18.1 | 15.9 |
| Fe$_2$O$_3$ | 4.9 | 3.9 | 3.8 | 2.0 |
| K$_2$O | 3.5 | 4.4 | 4.4 | 4.6 |
| CaO | 3.0 | 0.9 | 1.0 | 0.9 |
| Na$_2$O | 6.7 | 2.7 | 1.0 | 0.4 |
| MgO | 0.7 | 0.8 | 0.4 | 0.1 |
| NiO | 0.0 | 3.1 | 4.8 | 7.6 |
| Total | 99.7 | 97.7 | 100.8 | 99.2 |

Cation Distribution (Equiv./Al in Structure)

| Sample | Original | Catalyst 4 | Catalyst 5 | Catalyst 6 |
|---|---|---|---|---|
| K | 0.25 | 0.31 | 0.26 | 0.27 |
| Ca | 0.36 | 0.11 | 0.10 | 0.10 |
| Na | 0.73 | 0.28 | 0.09 | 0.04 |
| Mg | 0.14 | 0.13 | 0.05 | 0.02 |
| Ni | 0.00 | 0.27 | 0.44 | 0.65 |
| Total | 1.48 | 1.10 | .94 | 1.08 |

Example 8

Catalysts 5 and 6 prepared as above were evaluated for their catalytic properties with the hydrogenolysis and oxidation tests previously described. The results are shown in the following table:

TABLE

|  | Hydrogenolysis | | Oxidation at 650° F., iC$_6$nC$_6$ |
|---|---|---|---|
|  | iC$_8$/nC$_8$ | iC$_6$/nC$_6$ |  |
| Catalyst 5 (900° F.) | Nil/68 | Nil/15 | Nil/85.4 |
| Catalyst 6 (800° F.) | 87/100 | 91/95 | |

The above test clearly indicates that the Catalyst 6 which was base exchanged at conditions producing nickel hydroxide did not retain any selective properties in that it converted both the n- and iso-compounds. The difference in catalytic properties between Catalyst 5 and Catalyst 6 made it obvious that there are significant amounts of nickel sites on the exterior of the aluminosilicate designated as Catalyst 6. In order to confirm that fact, samples of Catalysts 5 and 6 were back exchanged repeatedly with 1 n-calcium chloride solutions at room temperature and with boiling 1 n-calcium chloride solutions over extended periods of time wherein the total exchange time amounted to between 40 and 50 hours. The back exchange samples have the compositions shown in the following table:

TABLE.—CATION DISTRIBUTION OF CALCIUM EXCHANGED NICKEL OFFRETITE
[Equiv./Al in structure]

| Cation | Catalyst 5 (before calcium exch.) | Catalyst 5 (after calcium exch.) | Catalyst 6 (before calcium exch.) | Catalyst 6 (after calcium exch.) |
|---|---|---|---|---|
| K | 0.26 | 0.27 | 0.27 | 0.23 |
| Ca | 0.10 | 0.77 | 0.10 | 0.74 |
| Na | 0.09 | 0.01 | 0.04 | 0.03 |
| Mg | 0.05 | 0.00 | 0.02 | 0.02 |
| Ni | 0.44 | 0.08 | 0.65 | 0.14 |
|  | 0.94 | 1.13 | 1.08 | 1.16 |

Example 9

The catalytic properties of the calcium back-exchange nickel offretites were then evaluated with the hydrogenolysis test previously described and in this test the calcium back-exchanged nickel offretite prepared in accordance with Example 5 was designated as 7 and the calcium-exchanged nickel offretite prepared in accordance with Example 6 was designated as 8. The results are shown in the following table:

TABLE.—CONVERSION, WT.%/WT.%

| Catalyst | Hydrogenolysis at 900° F. | |
|---|---|---|
|  | iC$_8$nC$_8$ | iC$_6$/nC$_6$ |
| 7 | nil/nil | nil/nil |
| 8 | 100/100 | 100/100 |

The above results show that back exchange with calcium chloride results in the case of Catalyst 7 of a totally inactive catalyst, while in the case of Catalyst 8 an active catalyst is produced which is totally non-selective, thereby demonstrating the criticality of preventing hydroxide formation during the base exchange step.

Example 10

Another sample of natural offretite was treated with sulfuric acid according to the procedure set forth in Example 3 and thereafter contacted with a 0.5 nickel chloride solution in accordance with the procedure described in Example 3, with the exception that the treatment was for 60 minutes instead of 10 minutes thereby resulting in the formation of nickel hydroxide. This catalyst is identified as Catalyst 9.

The catalyst was then subjected to the hydrogenolysis test previously described with the following results:

TABLE

| | Hydrogenolysis, wt.H/wt.H | |
|---|---|---|
| | 900° F. $iC_8/nC_8$ | 800° F. $iC_6/nC_6$ |
| Catalyst 9 | 100/100 | 100/100 |

From the above experiment it can be seen that although Catalyst 9 was active, it exhibited no shape-selective properties in that it equally converted both normal and iso-compounds, thereby again demonstrating the criticality preventing hydroxide formation during the base exchange step.

Example 11

Fifty grams of a synthetic crystalline aluminosilicate identified as Zeolite T were treated with 2500 cubic centimeters of a 5.0 normal aqueous solution of ammonium chloride for two separate contacts, each being 2 hours in duration, and thereafter subjected to a third contact for 64 hours, followed by washing with distilled water and drying overnight at 100° F.

The ammonium exchange material analyzed as follows:

| | Wt. percent |
|---|---|
| $K_2O$ | 2.53 |
| $Na_2O$ | 0.04 |
| $SiO_2$ | 78.0 |
| $Al_2O_3$ | 18.7 |
| Total | 99.27 |

CATION DISTRIBUTION (EQUIV./Al IN STRUCTURE)

| | |
|---|---|
| K | 0.15 |
| Na | <0.01 |
| Si-Al ratio | 3.56 |

Example 12

8.8 grams of the ammonium exchange zeolite prepared in accordance with Example 11 were added to 30 cubic centimeters of a 0.5 normal nickel acetate solution which was refluxing at 100° C. and maintained therein for 10 minutes. No nickel hydroxide was detected.

The aluminosilicate was immediately removed from the solution and washed with 1 liter of water and then dried overnight at 100° C. This catalyst is identified as Catalyst 10.

Example 13

The procedure of Example 12 was repeated with the exception that 150 cubic centimeters of a 0.1 normal solution of nickel acetate was employed and the base exchange was carried out for 60 minutes instead of 10 minutes. Nickel hydroxide formed and precipitated. This catalyst is identified as Catalyst 11.

Example 14

The procedure of Example 12 was repeated with the exception that a 0.5 normal solution of cobalt acetate was employed instead of nickel acetate and the base exchange time was for 5 minutes instead of 10 minutes. No cobalt hydroxide was detected. This catalyst is identified as Catalyst 12.

Example 15

The procedure of Example 14 was repeated with the sole exception that the contact time was for 10 minutes instead of 5 minutes. No cobalt hydroxide was detected. This catalyst is identified as Catalyst 13.

0.5 cubic centimeter of each of the catalysts identified as Catalysts 10, 11, 12 and 13 were calcined in flowing air at 1000° F. for one hour and then reduced with hydrogen at 1000° F. from 20 minutes followed by cooling.

Each of the catalysts was then tested for its ability to selectively hydrogenate normal hexene from a 1 to 1 mixture of normal hexene-2 and cyclohexene at an LHSV of 0.6, a 4.4 to 1 mole ratio of hydrogen to hydrocarbon, and at atmospheric pressure. The results obtained are shown in the following table:

TABLE

| | Catalysts | | | |
|---|---|---|---|---|
| | 10 | 11 | 12 | 13 |
| Nickel, wt. percent | 1.62 | 2.83 | | |
| Cobalt, wt. percent | | | 2.21 | 2.00 |
| Equivalents Ni or Co per aluminum atom | 0.15 | 0.26 | 0.20 | 0.19 |
| Percent hydrogenation at 250° F.: | | | | |
| Noramal hexene-2 | | 52 | | |
| Cyclohexene | | 35 | | |
| 300° F. Percent Hydrogenation: | | | | |
| Noraml hexene-2 | | 83 | | |
| Cyclohexene | | 63 | | |
| 350° F. Percent Hydrogenation: | | | | |
| Noraml hexene-2 | Nil | | Nil | |
| Cyclohexene | Nil | | Nil | |
| 400° F. Percent Hydrogenation: | | | | |
| Noraml hexene-2 | 62 | | 7 | Nil |
| Cyclohexene | 12 | | <1 | Nil |
| 450° F. Percent Hydrogenation: | | | | |
| Normal hexene-2 | 75 | | 32 | 13 |
| Cyclohexene | 35 | | ≤1 | <1 |
| 500° F. Percent Hydrogenation: | | | | |
| Noraml hexene-2 | | | 53 | 50 |
| Cyclohexene | | | 8 | 10 |

The above table clearly demonstrates that if hydroxides are formed, no selective catalysts are obtained. As can be seen, Catalyst 11 was prepared with an exchange time of 60 minutes with an extremely dilute solution of nickel acetate and yet no selectivity was obtained due to hydroxide formation, although activity was higher than that of Catalyst 10 due to higher nickel content whereas the results show that Catalysts 10, 12 and 13 are stable, shape-selective catalysts.

EXAMPLE 16

This example will illustrate the effect of the silicon to aluminum atomic ratio in the production of the novel catalysts of this invention.

In this example a synthetic crystalline aluminosilicate identified as Zeolite A, and having a silicon to aluminum atomic ratio of 1.0, was subjected to the following two treatments:

(1) One sample was subjected to four separate treatments, each being 30 minutes in duration, with a 0.5 normal solution of nickel nitrate at room temperature, washed with water followed by back exchange with a 0.5 normal solution of calcium chloride overnight at room temperature. This procedure resulted in the production of a catalyst having a 0.6 weight percent nickel content wherein 2.7 percent of the total cationic sites were occupied by divalent nickel cations.

(2) The second sample of Zeolite A was subjected to four 30 minute exchanges with a 0.5 normal solution of nickel nitrate at room temperature, followed by an additional four exchanges each of 10 minutes in duration with the nickel nitrate at 212° F. The exchange sample was then back exchanged with a 0.5 normal calcium chloride solution overnight at room temperature. The resulting catalyst contained 7.3 weight percent nickel and 72.8 percent of the total cationic sites were occupied by divalent nickel.

Both samples of the catalyst prepared in the above manner were then subjected to the hydrogenolysis test previously described with the following results:

| | Conversion Ratios, wt. percent/wt. percent $iC_8/nC_8$ | Temperature, (° F.) |
|---|---|---|
| Catalyst prepared by Method 1 | 62/77 | 700 |
| Catalyst prepared by Method 2 | 100/100 | 700 |

From the above it can be seen that neither experiment resulted in the production of a shape-selective aluminosilicate of the character described in the instant application.

EXAMPLE 17

The catalyst prepared in accordance with the procedure of Example 2 was subjected to six different experiments in order to demonstrate its utility for the shape-selective hydrocracking of normal octane from a mixture of the same with iso-octane.

A 1/1 weight blend of normal octane and 2,2,4-trimethylpentane with a 30/1 mole ratio of hydrogen to hydrocarbons was passed over the catalyst at 2000 p.s.i.g. and at various temperatures and space velocities which will be shown in the following table together with the dramatic results obtained therefrom:

| Run No. | 1 | 2 | 3 | 4 | 5 | 6 |
|---|---|---|---|---|---|---|
| Temperature, °F | 800 | 800 | 800 | 800 | 800 | 750 |
| LHSV | 2 | 3 | 4 | 5 | 14 | 14 |
| Time, hours | 1 | 1 | 1 | 2 | 0.5 | 0.5 |
| Conversion, normal octane wt. percent | 100 | 100 | 100 | 100 | 86.5 | 30.4 |
| Conversion, iso-octane, wt. percent | | | | 11.0 | 5.3 | Nil |

The above experiments clearly demonstrate the shape-selective hydrocracking which can be carried out utilizing the novel catalysts of this invention.

EXAMPLE 18

The catalyst prepared in accordance with Example 1 was then subjected to the hydrocracking of a $C_{10}$–$C_{16}$ paraffinic fuel charge having the following composition:

Specific gravity _____ 0.7674

Composition:
  Paraffins:
    Total wt. percent _____ 90
    Normal wt. percent _____ 26
    Carbon No. range _____ 10–16
    Average carbon No. _____ 12.6
  Olefins, wt. percent _____ 1.0
  Naphthenes, wt. percent _____ 7.4
  Aromatics, wt. percent _____ 1.6
Freezing point °F. _____ −41
Aniline point No., °F. _____ 181.8
Boiling range, °F. ASTM _____ 398–494
Initial true boiling point (ITBP), °F. ____ 35.8

The reaction conditions employed were a pressure of 2000 p.s.i.g., a 27/1 mole ratio of hydrogen to hydrocarbon, temperatures ranging from 700° F. to 750° F. and varying space velocities from 14–30 LHSV.

TABLE

| Run No. | 1 | 2 | 3 | 4 |
|---|---|---|---|---|
| Temperature, °F | 700 | 750 | 750 | 750 |
| LHSV | 14 | 14 | 20 | 30 |
| Time, hours | 1 | 2 | 1 | 1 |
| Conversion Data: | | | | |
| Jet fuel product, 358° F.+ received, wt. percent charge | 89 | 66 | 82 | 84 |
| Overall Conversion based on jet fuel product received, wt. percent charge | 11 | 34 | 18 | 16 |
| Percent n-paraffin in charge stock converted | 17.8 | 77.3 | 52.7 | 41.9 |
| Percent non-normal components in charge stock converted | 8.4 | 18.8 | 6.1 | 6.9 |
| Composition Data: | | | | |
| n-Paraffins in jet fuel product | 24 | 9 | 15 | 18 |
| Distribution of lower boiling products, wt. percent: | | | | |
| $C_1$–$C_2$ | 2.8 | 3.2 | 3.3 | 5.0 |
| $C_3$ | 36.7 | 32.4 | 39.5 | 29.4 |
| $C_4$s | 17.4 | 20.6 | 19.4 | 19.4 |
| $C_5$, 358° F. | 43.1 | 43.8 | 37.8 | 46.2 |
| Total | 100.0 | 100.0 | 100.0 | 100.0 |
| Percent normal in $C_4$ products | 75 | 81 | 86 | 83 |
| Percent normal in $C_5$ products | 76 | 58 | 80 | 67 |
| Property Data: | | | | |
| Freezing Point, °F | −46 | −64 | −64 | −56 |
| Aniline Number, °F | 183.2 | 183.2 | 182.5 | 182.3 |
| Specific Gravity | 0.7674 | 0.7680 | 0.7674 | 0.7676 |

The shape-selective hydrocracking of normal paraffins is again conclusively demonstrated, not only by the conversion data but also by the composition data. It is noteworthy that nearly half of the lower boiling products fall in the gasoline range ($C_5$–358° F.) indicating appreciable center cracking as expected from hydrocracking.

Example 19

A catalyst prepared in accordance with the procedure of Example 2 which had been previously used to hydrocrack various hydrocarbon charges so that its activity had been decreased due to the deposition of coke was regenerated by contacting it with a mixture of 98 percent nitrogen and 2 percent oxygen at 750° F. and at 900° F. and thereafter contacting it with air at 1000° F. for about 16 hours, followed by recontacting with hydrogen at 900° F. for one hour.

The above regenerated catalyst was then tested for hydrocracking of a $C_6$ reformate charge analyzing as follows:

N-hexane, wt. percent _____ 22.5
2-methylpentane, wt. percent _____ 12.2
2,3-dimethyl butane, wt. percent _____ 4.9
2,2-dimethyl butane, wt. percent _____ 8.4
Benzene, wt. percent _____ 52.0

The test procedure involved charging the above blend over the regenerated catalyst at 2000 p.s.i.g. with a 30/1 mole ratio of hydrogen to hydrocarbon feed, a space velocity of 14 LHSV and a temperature of 750° F.–800° F. with the following results:

TABLE

| | Charge | Run No. 1 | Run No. 2 |
|---|---|---|---|
| Temperature, °F | | 800 | 750 |
| LHSV | | 14 | 14 |
| Time, hours | | 1 | 1 |
| Conversion Data, wt. percent: | | | |
| Overall, based on liquid recovery | | 31.4 | 21.5 |
| n-Hexane | | 75 | 56 |
| 2-methylpentane | | 24 | 16 |
| 2,3-dimethyl butane | | | |
| 2,2-dimethyl butane | | 32 | 17 |
| Benzene | | 15 | 8 |
| Composition Data, $C_6$ Product, wt. percent: | | | |
| n-Hexane | 22.5 | 8.2 | 12.6 |
| 2-methylpentane | 17.1 | 18.4 | 17.8 |
| 2,3-dimethyl butane | | | |
| 2,2-dimethyl butane | 8.4 | 8.3 | 7.8 |
| Benzene | 52.0 | 63.3 | 60.5 |
| methyl cyclopentane | | 1.7 | 1.2 |

The above data clearly illustrates the superiority of the novel shape-selective catalyst of this invention and a most remarkable result is the inertness of benzene under such severe hydrogenation conditions, whereas in the presence of a conventional hydrogenation catalyst complete hydrogenation of benzene would occur. The lack of activity for the hydrogenation of benzene as compared with the complete hydrogenation of $C_2$ to $C_5$ olefins to normal paraffins conclusively demonstrates that the majority of the hydrogenation component is located within the intracrystalline cavities of the aluminosilicate.

Example 20

A synthetic crystalline aluminosilicate identified as synthetic faujasite of the Y type is contacted with a 0.5 normal solution of nickel acetate at 100° C. for 10 minutes and thereafter washed with distilled water. No nickel hydroxide is detected.

Five grams of the catalyst are contacted with a mixture of benzene and triethyl benzene and hydrogen at an initial pressure of 30 p.s.i.g. under constant agitation. An analysis of the result shows a substantial conversion of benzene in preference to the conversion of triethyl benzene.

What is claimed is:

1. A process for the preparation of a stable, shape-selective crystalline aluminosilicate which comprises contacting a crystalline aluminosilicate having a pore size of about 5 angstrom units and a silicon to aluminum atomic ratio of at least 1.8 with a solution of metal ions having hydrogenation/dehydrogenation activity at elevated temperatures and at a pH below that at which the hydroxide of said metal ion is substantially formed and for a period of time not to exceed 10 minutes.

2. A stable, shape-selective crystalline alumino-silicate having a pore size of about 5 angstrom units and characterized by (a) a silicon to aluminum ratio of at least 1.8; (b) substantially free of metal cations having hydrogenation/dehydrogenation activity on the exterior thereof; and (c) containing within the interior thereof at least one one metal having hydrogenation/dehydrogenation activity than 1.0 cation in a supercage.

3. The composition of claim 2 wherein the metal cations are selected from the group consisting of nickel, cobalt, platinum and silver.

4. A novel shape-selective crystalline aluminosilicate having a pore size of about 5 angstrom units characterized by (a) a silicon to aluminum ratio of at least 3.0; (b) substantially free of hydrogenation/dehydrogenation activity on the exterior thereof; and (c) containing within the interior thereof at least one metal having hydrogenation/dehydrogenation activity in amounts of no more than 1.0 cation in a supercage.

5. The composition of claim 4 wherein the metal cations are selected from the group consisting of nickel, cobalt, platinum and silver.

6. A stable, shape-selective crystalline aluminosilicate identified as offretite, characterized by being substantially free of hydrogenation/dehydrogenation activity on the exterior thereof and containing nickel cations within the interior thereof in amounts of no more than 1.0 nickel cation in a supercage.

7. A process for selectively conducting an organic chemical reaction which comprises passing hydrogen and a reaction mixture consisting of components of different molecular shapes over a crystalline aluminosilicate catalyst as defined in claim 2, said catalyst having a pore size sufficiently large to admit at least one of said components and hydrogen but sufficiently small to exclude at least one remaining component, and effecting a catalytic conversion of the component material admitted to contact with said catalyst within the interior of said crystalline aluminosilicate to convert the same to chemical species distinct from said admitted component and of a molecular shape capable of passing from the interior of said aluminosilicate and simultaneously withdrawing said chemical species from the effluent stream passed over said crystalline aluminosilicate.

8. A process as defined in claim 7 in which a hydrocarbon mixture is selectively hydrocracked.

9. A process for selectively hydrocracking normal paraffins and normal olefins from a reaction mixture consisting of components of different molecular shapes which comprises contacting the reaction mixture with hydrogen at hydrocracking conditions over a crystalline aluminosilicate as defined in claim 4.

References Cited
UNITED STATES PATENTS 3,236,762  2/1966  Rabo et al. _____ 208—111

ABRAHAM RIMENS, *Primary Examiner.*
DELBERT E. GANTZ, *Examiner.*

UNITED STATES PATENT OFFICE
CERTIFICATE OF CORRECTION

Patent No. 3,379,640

April 23, 1968

Nai Yuen Chen et al.

It is hereby certified that error appears in the above numbered patent requiring correction and that the said Letters Patent should read as corrected below.

Column 4, line 42, after "minosilicate" insert -- so that the aluminosilicate --. Column 8, line 3, "tween 400° F. and 825° F. using a molar ratios with" should read -- under a pressure of about 10 to 3000 psig or more, --; line 9, after "tween" cancel "400° F. and 825° F. using molar ratios with" and insert -- 2 and 80. The pressure employed will vary between --. Column 11, in the TABLE, fourth column, line 8 thereof, "4.8" should read -- 5.8 --. Column 13, in the TABLE, "Hydrogenolysis, wt. H/wt.H" should read -- Hydrogenolysis, Wt.%/Wt.% --. Column 14, in the TABLE, fourth column, third line from the bottom, "$\leq$1" should read -- <1 --. Column 17, line 20, before "than" insert -- in amounts of no more --.

Signed and sealed this 11th day of November 1969.

(SEAL)
Attest:

EDWARD M. FLETCHER, JR.
Attesting Officer

WILLIAM E. SCHUYLER, JR.
Commissioner of Patents